United States Patent [19]

Kimura

[11] Patent Number: 4,606,443
[45] Date of Patent: Aug. 19, 1986

[54] PLANETARY DRIVE WITH OVERLOAD CLUTCH RELEASE MEANS FOR AN ANTENNA

[75] Inventor: Misao Kimura, Yokosuka, Japan

[73] Assignee: Harada Industry Co., Ltd., Tokyo, Japan

[21] Appl. No.: 674,080

[22] Filed: Nov. 23, 1984

[30] Foreign Application Priority Data

Nov. 30, 1983 [JP] Japan ............................ 58-226644
Nov. 30, 1983 [JP] Japan ............................ 58-226645

[51] Int. Cl.$^4$ .................... F16D 3/06; F16D 7/00; F16D 13/76
[52] U.S. Cl. .................... 192/20; 192/89 A; 192/109 R; 192/150; 192/56 R; 74/788
[58] Field of Search .............. 192/56 R, 89 A, 90, 192/92, 109 R, 150, 20; 74/785, 788; 464/40

[56] References Cited

U.S. PATENT DOCUMENTS

| | | | |
|---|---|---|---|
| 2,539,425 | 1/1951 | Huntar | 192/56 R |
| 2,684,738 | 7/1954 | Kaplan | 192/56 R |
| 3,722,644 | 3/1973 | Steinhagen | 192/56 R |

FOREIGN PATENT DOCUMENTS

| | | |
|---|---|---|
| 48-7623 | 2/1973 | Japan . |
| 48-31867 | 9/1973 | Japan . |
| 52-30834 | 7/1977 | Japan . |
| 53-1476 | 1/1978 | Japan . |
| 53-25069 | 6/1978 | Japan . |
| 54-156949 | 12/1979 | Japan . |
| 56-104207 | 8/1981 | Japan . |
| 57-26405 | 6/1982 | Japan . |
| 57-194931 | 12/1982 | Japan . |
| 58-26204 | 2/1983 | Japan . |
| 58-28405 | 2/1983 | Japan . |
| 58-13601 | 3/1983 | Japan . |

Primary Examiner—George H. Krizmanich
Attorney, Agent, or Firm—Frishauf, Holtz, Goodman & Woodward

[57] ABSTRACT

A driving rotary member which is rotatably fitted around a main shaft is rotated by a driving force from a motor. An intermediate gear is rotatably provided on one surface of the driving rotary member so as to have a different axis from that of the main shaft. A clutch gear having a gear portion, meshing with the intermediate gear and a clutch disk member, is rotatably fitted around the main shaft. A clutch plate is fitted around the main shaft so as to be rotated integrally with the driving rotary member while being brought into contact with the clutch disk of the clutch gear. The clutch plate is brought into contact with the disk of the clutch gear by a contact means. A driven rotary member having a gear portion on an inner surface thereof which meshes with the intermediate gear is also fitted around the main shaft so as to be rotatable together with and relative to the driving rotary member. A driving force transmitted from the driving rotary member is supplied to the antenna by the driven rotary member.

7 Claims, 16 Drawing Figures

PLANETARY DRIVE WITH OVERLOAD CLUTCH RELEASE MEANS FOR AN ANTENNA

BACKGROUND OF THE INVENTION

The present invention relates to a clutch apparatus for an antenna which is raised and lowered by a driving force from a motor.

Various clutch apparatuses of this type have been conventionally available. As disclosed in Japanese Utility Model Publication No. 48-7623, the most popular type of apparatus comprises a driving clutch plate rotated by a driving force from a motor and a driven clutch plate coupled to an antenna. The driving clutch plate is brought into tight contact with the driven clutch plate. In the case when the antenna is raised or lowered, the driving and driven clutch plates are rotated together, and the antenna is thereby raised or lowered by the driving force of the driven clutch plate. When the telescopic operation of the antenna is completed, the driven clutch plate is stopped, and the driving clutch plate is kept rotating in a slipping state with respect to the driven clutch plate. Thereafter, a limit switch or the like is operated, thereby stopping rotation of the driving clutch plate. Note that a plurality of recesses and projections are formed on a contact surface between the driving and driven clutch plates in order to obtain a desired clutch force.

In the clutch apparatus having the above arrangement, the driving force transmitted from the motor to the antenna mainly depends upon a frictional force between the driving and driven clutch plates. For this reason, sufficiently large contact force must be applied between the driving and driven clutch plates. For example, assume that, when the antenna is raised or lowered, a load of about 7.5 kg is required to drive the driven clutch plate. In this case, when the recesses and projections are formed on the contact surfaces of the two clutch plates, a contact force of about 20 kg must be applied. On the other hand, in the case of clutch plates having no recesses and projections on their contact surfaces, a contact force of about 30 to 50 kg must be applied. As a result, in order to maintain a sufficient contact force, at least one large and strong spring is needed, resulting in a bulky apparatus. Furthermore, when the driven clutch stops, that is, when the telescopic operation of the antenna is completed, the driving clutch plate slips, thereby generating loud noise.

SUMMARY OF THE INVENTION

It is an object of the present invention to provide a clutch apparatus for an antenna which is raised and lowered by a driving force from a motor, wherein the apparatus can be reduced in size, and when the telescopic operation of the antenna is completed, the friction of a clutch unit of the apparatus can be reduced and noise generated thereby can be decreased.

A clutch apparatus for use with an antenna which is raised and lowered by a driving force from a motor according to the present invention comprises:

a main shaft;

a driving rotary member which is fitted around said main shaft and is rotated by a driving force from a motor;

an intermediate gear which is rotatably fitting around an axis which is provided on one surface of said driving rotary member and is different from said main shaft;

a clutch gear which is fitted around said main shaft so as to be rotatable together with and relative to said driving rotary member, said clutch gear having a gear portion meshing with said intermediate gear, and a clutch disk member;

at least one clutch plate which is provided at said main shaft to be rotatable together with said driving rotary member while being in contact with said clutch disk member of said clutch gear;

contact means for bringing said clutch plate into contact with said clutch disk member of said clutch gear; and a driven rotary member which is fitted around said main shaft so as to supply the driving force transmitted from said driving rotary member to the antenna, said driven rotary member having a gear portion meshing with said intermediate gear on an inner surface thereof, wherein when a telescopic operation of the antenna is performed, said driving and driven rotary members are rotated together by the driving force from the motor and the antenna is thereby raised or lowered by a rotating force of said driven rotary member, and when the telescopic operation of the antenna is completed, said driven rotary member is stopped and thereafter said driving rotary member continues to be rotated for a predetermined interval.

According to the present invention, an intermediate gear which meshes with a gear portion provided on an inner surface of a driven rotary member and a clutch gear which meshes with the intermediate gear comprise the so-called planetary gears. A clutch plate which is rotated integrally with a driving rotary member is brought into contact with a disk member of the clutch gear. When the antenna is raised or lowered, the intermediate gear is not independently rotated, but a driving force of the driving rotary member is transmitted to the driven rotary member through the intermediate gear. However, in a conventional clutch apparatus, since the driving force of the driving rotary member is transmitted to the driven rotary member only by the contact force, a large contact force is required. Therefore, the clutch apparatus of the present invention can reduce the contact force in comparison to the conventional clutch apparatus. As a result, since only a small contact force is required, the clutch apparatus can become compact in size. Friction of the clutch members occuring upon the telescopic operation of the antenna can be reduced, resulting in a decrease in a motor load. In addition to this, the slipping noise of the clutch members can be decreased.

DETAILED DESCRIPTION OF THE PREFERRED EMBODIMENTS

Figure 1:
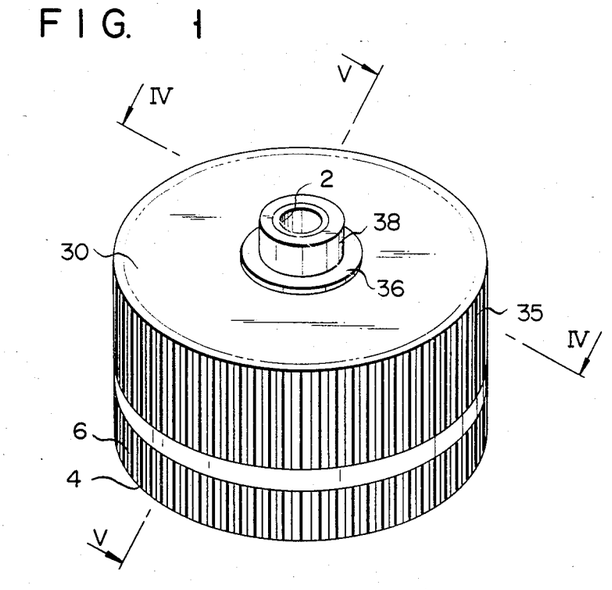
FIG. 1 is a perspective view showing an overall structure of a clutch apparatus according to a first embodiment of the present invention.
Figure 2:
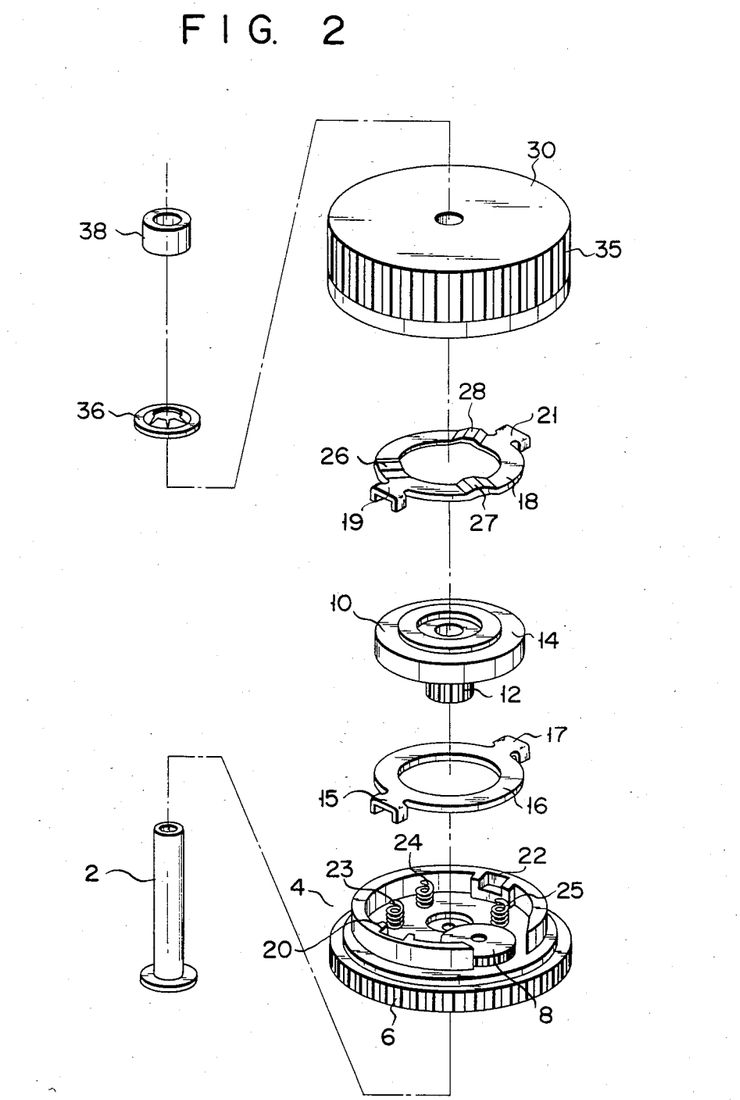
FIG. 2 is an exploded perspective view of the apparatus.

An embodiment of a telescopic antenna clutch apparatus which is driven by a driving force from a motor according to the present invention will be described with reference to FIGS. 1 to 5 hereafter. A cylindrical main shaft 2 is rotatably fitted into a fixed support shaft (not shown) which is arranged on a base of an antenna driving apparatus. A driving rotary member 4 is rotatably fitted around the main shaft 2. The driving rotary member 4 comprises a disk-shaped base and a substantially cylindrical wall which is integrally extended from the upper surface thereof. In addition, a gear portion 6 for receiving a driving force from a motor (not shown) is provided on an outer peripheral surface of the base of the rotary member 4. A driven rotary member 30 is rotatably fitted around the main shaft 2. A distal end of the main shaft 2, upwardly extending from the central portion of the driven rotary member 30, is provided with a push nut 36 and a cap 38 to prevent removing of the driven rotary member 30 from the main shaft 2. A small intermediate gear 8 is rotatably fitted around a shaft which is projected from the upper surface of the base of the driving rotary member 4 and is located inside the cylindrical wall thereof so as to have a different axis from that of the main shaft 2, as shown in FIG. 2. A clutch gear 10 is fitted around the main shaft 2 so as to be rotatable together with and relative to the driving rotary member 4. A gear portion 12 which meshes with the intermediate gear 8 is formed on the outer surface of a shaft portion of the clutch gear 10. A clutch disk 14 is integrally formed on an end portion of the shaft portion of the clutch gear 10. First and second clutch plates 16 and 18 having substantially a ring-like shape are positioned on lower and upper surfaces of the disk 14 of the clutch gear 10, respectively. Both the clutch plates 16 and 18 are engaged with the driving rotary member 4 so as to be integrally rotatable therewith. In other words, the clutch plate 16 has at its circumference projections 15 and 17 which project in the opposite directions, and the clutch plate 18 has at its circumference projections 19 and 21 which project in the opposite directions. The projections 15 and 19 and the projections 17 and 21 are respectively received in notches 20 and 22 formed in the inner peripheral surface of the cylindrical wall of the driving rotary member 4, and are engaged with inner surfaces thereof.

Figure 3:
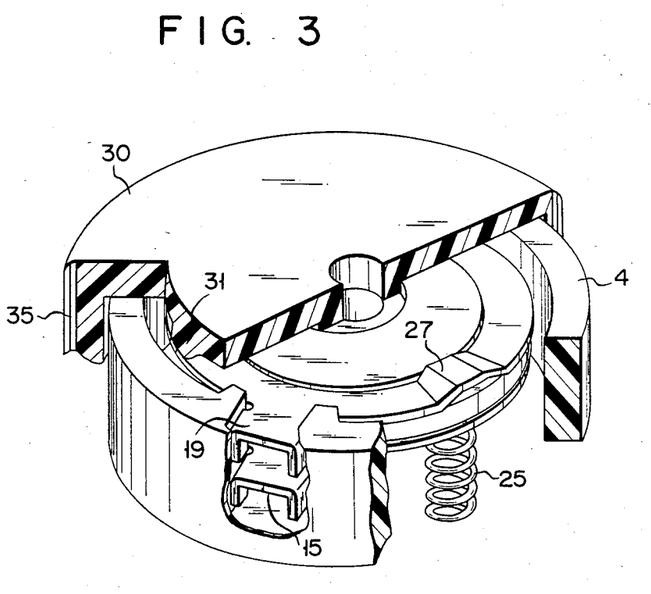
FIG. 3 is a partially cut-away perspective view of the apparatus.
Figure 4:
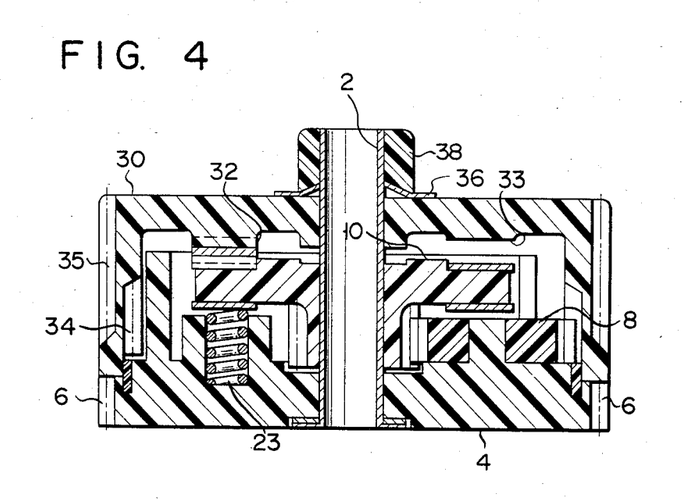
FIG. 4 is a sectional view of FIG. 3 along a line IV—IV therein.
Figure 5:
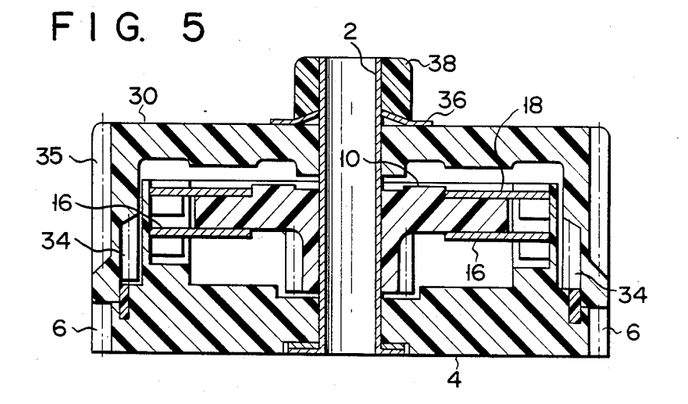
FIG. 5 is a sectional view of FIG. 3 along a line V—V therein.

Upper ends of coil compression springs 23, 24 and 25 whose lower ends are supported by the driving rotary member 4 are brought into tight contact with the lower surface of the first clutch plate 16. Three abutments 26, 27 and 28 which are separated from one another at a prescribed distance are formed on the upper surface of the second clutch plate 18. As shown in FIG. 3, abutments 31, 32 and 33 are formed on the lower surface of a disk-shaped base of the driven rotary member 30 so as to correspond to the abutments 26, 27 and 28. The abutments 26, 27, 28, 31, 32 and 33 have moderately inclined side surfaces and the inclinded surfaces of the abutments 31, 32 and 33 are respectively engaged with those of the abutments 26, 27 and 28.

The driven rotary member 30 comprises the disk-shaped base and a substantially cylindrical wall integrally formed thereon. The driven rotary member 30 is rotatably fitted around the main shaft 2 so as to be rotatable together with and relative to the driving rotary member 4. A gear portion 34 which meshes with the intermediate gear 8 is formed on the inner surface of the cylindrical wall of the driven rotary member 30 which is engaged with the driving rotary member 4. The second clutch plate 18 may be slidable on the inner surface of the disk-shaped base of the driven rotary member 30. A gear portion 35 for moving a drive cord for the telescopic antenna is formed on the outer peripheral surface of the driven rotary member 30. The drive cord (not shown) engages with the gear portion 35. In accordance with the moving operation of the drive cord, the antenna is raised or lowered.

The operation of the apparatus having the above arrangement will now be described. When a motor (not shown) for raising or lowering the antenna is rotated in a forward or reverse direction, the driving rotary member 4 is rotated in the forward or reverse direction. A rotating force of the driving rotary member 4 is transmitted to the driven rotary member 30 mainly through the intermediate gear 8. Thus, the driven rotary member 30 is rotated with the driving rotary member 4. The load of the antenna drive cord is applied to the driven rotary member 30. The first and second clutch plates 16 and 18 are brought into contact with each other through the clutch gear 10 by the coil springs 23, 24 and 25. The abutments 31, 32 and 33 of the driven rotary member 30 are respectively engaged with the abutments 26, 27 and 28 of the second clutch plate 18. For this reason, the clutch gear 10 is rotated together with the first and second clutch plates 16 and 18. The intermediate gear 8 which meshes with the gear portion 12 of the clutch gear 10 is not independently rotated with respect to the driving rotary member 4, but is rotated therewith. Therefore, the driving rotary member 4, the intermediate gear 8, the first and second clutch plates 16 and 18, the clutch gear 10 and the driven rotary member 30 are all integrally rotated. In this manner, the drive cord is driven by the gear portion 35 in accordance with the rotation of the driven rotary member 30, thereby raising or lowering the antenna. When the antenna is fully raised or lowered, the rotation of the driven rotary member 30 is prevented by the load applied from the antenna. The intermediate gear 8 is rotated by the rotating driving rotary member 4 so as to move along the gear portion 34 inside the driven rotary member 30 which is already stopped. At this time, the contact force for integrally rotating the clutch gear 10 with the first and second clutch plates 16 and 18 cannot resist the rotating force transmitted from the intermediate gear 8 to the clutch gear 10. For this reason, the clutch gear 10 is rotated relative to the first and second clutch plates 16 and 18. As a result, this represents a state wherein the clutch is released, and a motor lock is also released. Since the first and second clutch plates 16 and 18 continue to rotate with the driving rotary member 4, the second clutch plate 18 slides with respect to the base of the driven rotary member 30. Since the contact force is considerably smaller than that of the conventional apparatus, noise due to sliding is negligible.

Since the second clutch plate 18 and the driven rotary member 30 are respectively provided with the abutments 26, 27, and 28, and with the abutments 31, 32 and 33, the compression amount of the coil springs 23, 24 and 25 is intermittently changed during the sliding operation of the second clutch plate 18. In other words, when the abutments 26, 27 and 28 are urged against the abutments 31, 32 and 33, respectively, the compression amount becomes large. As a result, the contact force of the first and second clutch plates 16 and 18 with respect to the clutch gear 10 is also intermittently changed. Therefore, continuous friction between the clutch gear 10 and the first and second clutch plates 16 and 18 can be avoided, thereby decreasing heat due to friction. Therefore, seizing can be prevented and a minimum operation voltage, which is conventionally required to be 8 to 9 V, can be reduced to 6 V or less.

When the telescopic operation of the antenna is completed and a limit switch (not shown) or the like is operated, the motor stops rotating. Thus, rotation of the driving rotary member 4, the intermediate gear 8, the gear portion 12 of the clutch gear 10 and the first and second clutch plates 16 and 18 is also stopped.

According to the present invention, the intermediate gear 8 which meshes with the gear portion 34 provided on the inner surface of the driven rotary member 30, and the clutch gear 10 which is fitted with the gear portion 12 consist of planetary gears. The first and second clutch plates 16 and 18 which are rotated integrally with the driving rotary member 4 are brought into contact with the disk 14 of the clutch gear 10. When the antenna is raised or lowered, the intermediate gear 8 is not independently rotated, but the driving force of the driving rotary member 4 is transmitted to the driven rotary member 30 through the intermediate gear 8. Therefore, the contact force between the first and second clutch plates 16 and 18 can be considerably smaller in comparison to that of the conventional apparatus.

Since the conventional apparatus has no planetary gears in a portion corresponding to the contact portion between the second clutch plate 18 and the driven rotary member 30 in the present invention, the driving force of the conventional driving rotary member is transmitted by the frictional force of the contact portion, thus requiring a large contact force. However, in the apparatus of the present invention, the driving force of the driving rotary member 4 is mainly transmitted to the driven rotary member 30 through the intermediate gear 8. Therefore, the driving force is hardly transmitted by frictional force at the contact portion between the second clutch plate 18 and the driven rotary member 30. The above-mentioned contact portion supports only the second clutch plate 18 so that the urging force of the coil springs 23, 24 and 25 urges the first and second clutch plates 16 and 18 against the disk 14 of the clutch gear 10. The contact force between the first and second clutch plates 16 and 18 can be sufficient to hold the intermediate gear 8 in position, when the antenna is raised or lowered. In this case, as described above, since only the above-mentioned contact force is needed, the force can be small in comparison to that of the conventional apparatus.

Figure 6:
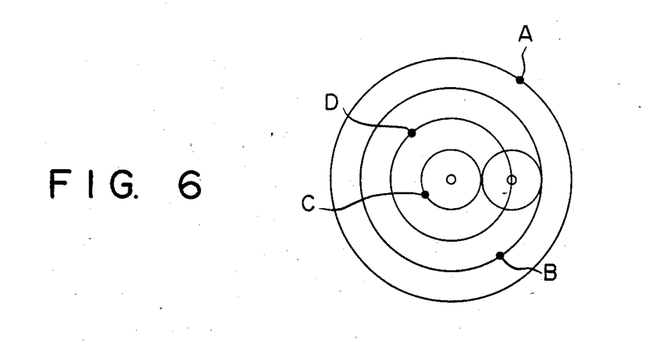
FIG. 6 is a representation showing the relationship of the rotating forces of the respective portions.

According to a study by the present inventor, it is found that a conventional flat-plate clutch generally requires a contact force of 30 to 50 kg, but in the present invention, a contact force of only 13 kg is required. FIG. 6 shows the relationship of the rotating force of the respective portions of the apparatus according to the present invention. Points A to D represent the gear portion 35 of the driven rotary member 30 which drives the drive cord, the gear portion 34 of the inner surface of the driven rotary member 30, the gear portion 12 of the clutch gear 10, and the contact portion between the clutch gear 10 and the first and second clutch plates 16 and 18, respectively. Radiuses at the respective points A to D are 27 mm, 22.8 mm, 6 mm and 13.5 mm. If a rotating force of 7.5 kg is required at the point A, the rotating forces required at the points B to D are 8.8 kg, 8.8 kg and 3.95 kg. In order to keep a rotating force of 3.95 kg at point D, a contact force of only 13 kg is required as described above.

It should be noted that the present invention is not limited to the above embodiment. For example, in the above embodiment, the two clutch plates 16 and 18 are provided to be in tight contact with the clutch gear 10. However, the present invention is not limited to two clutch plates. Three or more or only one (one side) clutch plate can be adopted. Meanwhile, in the above embodiment, the contact portion between the second clutch plate 18 and the driven rotary member 30 is provided with the abutments 26, 27 and 28, and the abutments 31, 32 and 33. However, these abutments are not always needed, and can be omitted. Various changes and modifications may be made within the scope and spirit of the present invention.

Figure 7:
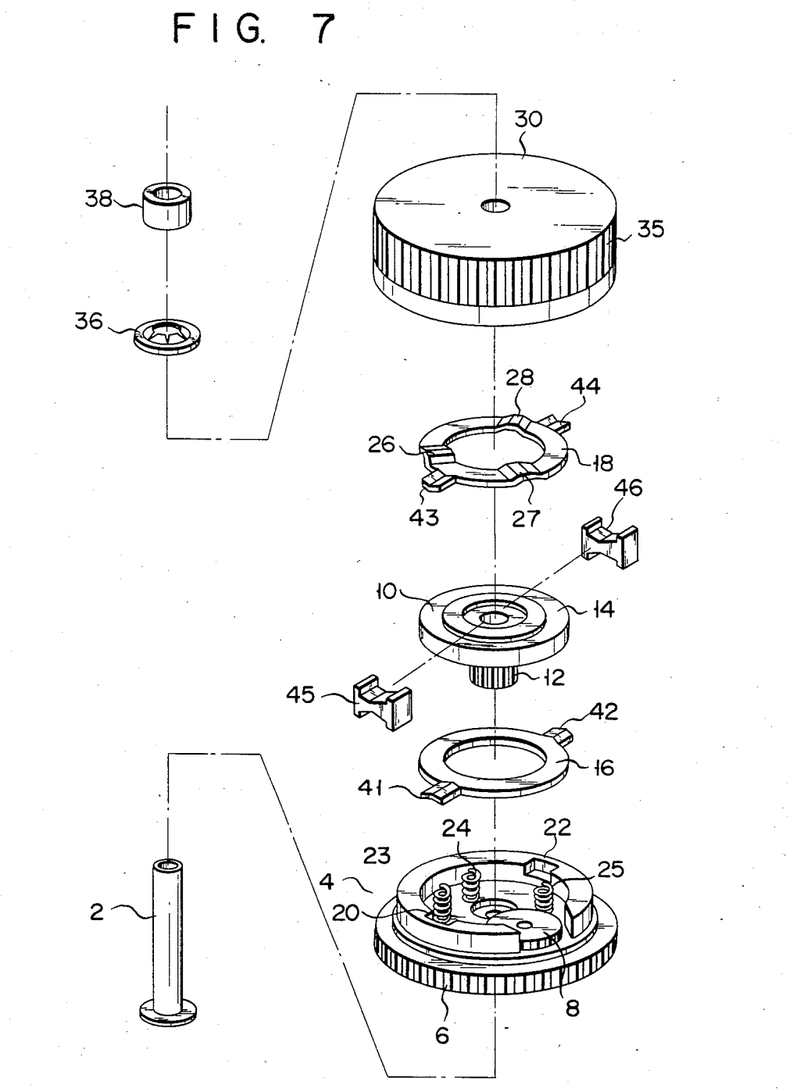
FIG. 7 is an exploded perspective view of a clutch apparatus according to a second embodiment.
Figure 8:
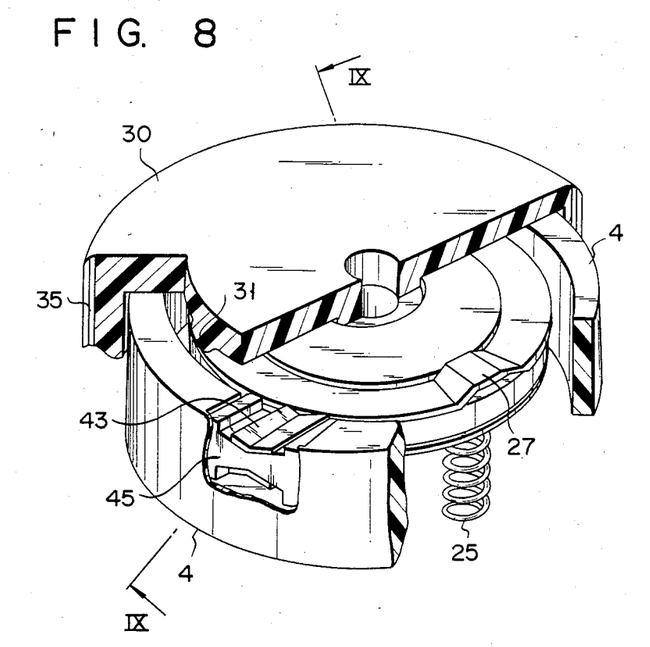
FIG. 8 is a partially cut-away perspective view of the apparatus of the second embodiment.
Figure 9:
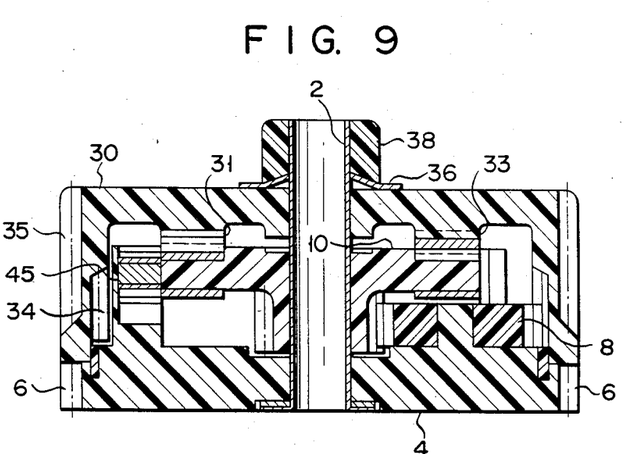
FIG. 9 is a sectional view of FIG. 8 along a line IX—IX, in which the members omitted in FIG. 8, namely, a main shaft, a push nut and a cap, are added.

FIGS. 7 to 13 show a second embodiment of the present invention. The same reference numerals as in FIGS. 7 to 13 denote the same parts as in FIGS. 1 to 6. As shown in FIGS. 7 to 9, first and second clutch plates 16 and 18 are respectively provided with projections 41 and 42, and 43 and 44 at opposing positions thereof. A spacer 45 is provided between the projections 41 and 43 and a spacer 46 is provided between the projections 42 and 44. These projections 41 to 44 are respectively engaged with notches 20 and 22 of a driving rotary member 4. Respective urging surfaces between the spacers 45 and 46 and the projections form shallow V-shapes, and the spacers 45 and 46 are received in the notches 20 and 22 so as to be movable along the axial direction of a main shaft 2.

The operation of the apparatus according to this embodiment will now be described. When a motor (not shown) for raising or lowering an antenna is rotated in a forward or reverse direction, the driving rotary member 4 is rotated in the forward or reverse direction. The rotating force of the driving rotary member 4 is mainly transmitted to a driven rotary member 30 through an intermediate gear 8. As a result, the driven rotary member 30 is rotated with the driving rotary member 4. In other words, the driving rotary member 4, the intermediate gear 8, the first and second clutch plates 16 and 18, the clutch gear 10 and the driven rotary member 30 are all integrally rotated. Thus, a drive cord is driven by a gear portion 35 in accordance with rotation of the driven rotary member 30, thereby raising or lowering the antenna.

Figure 10:
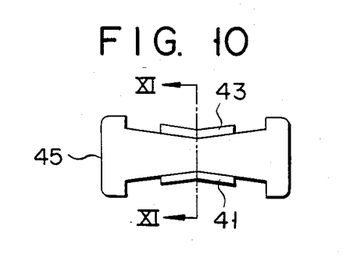
FIG. 10 is a view showing the releasing means of the second embodiment, in which a clutch force is not released.
Figure 11:
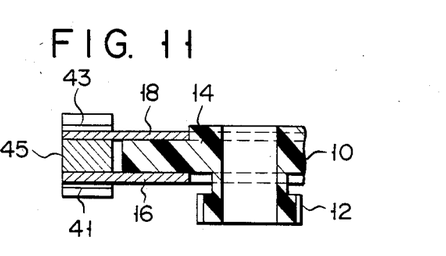
FIG. 11 is a sectional view of FIG. 10 along a line XI—XI therein.
Figure 12:
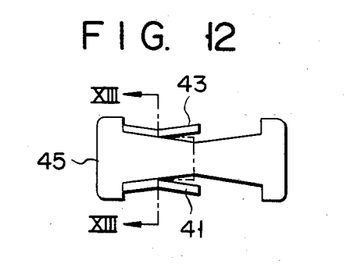
FIG. 12 is a view showing the releasing means of the second embodiment, in which a clutch force is released.
Figure 13:
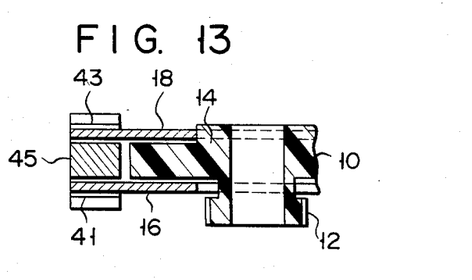
FIG. 13 is a sectional view of FIG. 12 along a line XIII—XIII therein.

When the telescopic operation of the antenna is completed, rotation of the driven rotary member 30 is prevented by a load from the antenna. Then, the intermediate gear 8 is rotated by the rotating driving rotary member 4 so as to move along the gear portion 34 formed on the inner surface of the driven rotary member 30 which is already stopped. In this case, since the rotating force transmitted from the intermediate gear 8 to the clutch gear 10 is sufficiently large, the contact force of the first and second clutch plates 16 and 18 with respect to the disk 14 of the clutch gear 10 cannot resist this rotating force. For this reason, the clutch gear 10 starts rotating at high speed. In this case, a state of the first and second clutch plates 16 and 18 shown in FIGS. 10 and 11 is changed into that shown in FIGS. 12 and 13 in accordance with rotation of the clutch gear 10. In other words, the respective projections 41 and 42, and 43 and 44 of the first and second clutch plates 16 and 18 are slid along the V-grooves of the spacers 45 and 46, respectively, and respective ring portions of the first and second clutch plates 16 and 18 are shifted in a direction so as to be spaced apart from the disk 14 of the clutch gear 10. Note that FIG. 13 shows the state where the ring portions of the first and second clutch plates 16 and 18 are completely spaced apart from the disk 14 of the clutch gear 10 in order to simplify description. However, in fact, the contact force only is decreased, and the ring portions are not completely spaced apart. Therefore, this represents the clutch releasing state in which a motor lock can be avoided. Since the first and second clutch plates 16 and 18 are shifted along a direction to be spaced apart from the disk 14 of the clutch gear 10, the contact force is decreased. As a result, the clutch gear 10 can be rotated more easily in comparison to the apparatus of the above embodiment. Therefore, motor lock can also be easily avoided.

Figure 14:
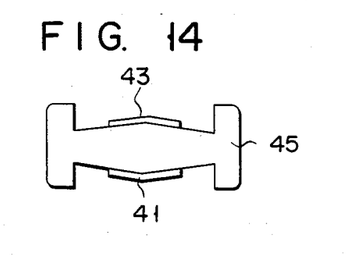
FIG. 14 is a view showing the releasing means of a modification, in which a clutch force is not released.
Figure 15:
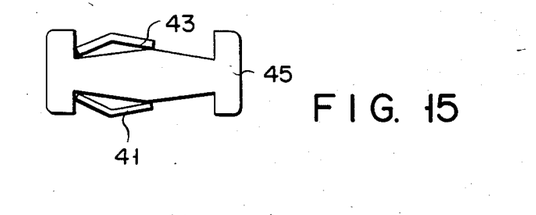
FIG. 15 is a view showing the releasing means of the modification, in which a clutch force is released.
Figure 16:
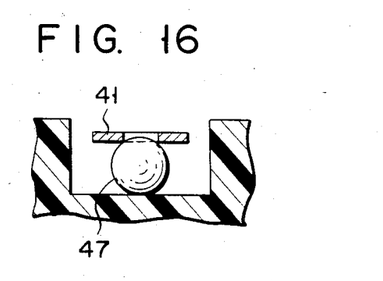
FIG. 16 is a view showing the releasing means of another modification.

FIGS. 14, 15 and 16 show modifications. As shown in FIGS. 14 and 15, the projections 41 and 42 of the first clutch plate 16, and 43 and 44 of the second clutch plate 18, respectively, are formed into V-shapes, and corresponding portions of the spacers 45 and 46 are also formed into V-shapes. As shown in FIG. 16, the projections 41 and 42 of the first clutch plate 16, and 43 and 44 of the second clutch plate 18, respectively, are provided with holes. Movable members 47 such as steel balls or rollers are engaged with these holes.

In the clutch apparatus according to the second embodiment and these modifications, when the telescopic operation of the antenna is completed, the driven rotary member 30 stops rotating, and the first and second clutch plates 16 and 18 are shifted along the direction so as to be spaced apart from the disk 14 of the clutch gear 10. As a result, since the contact force is decreased, during the interval from the time at which the telescopic operation of the antenna is completed to the time at which the rotation of the motor is stopped, a load of the motor can be considerably reduced. Furthermore, since the contact force of the contact portions can be decreased, friction between the contact portions can also be reduced, thereby decreasing noise and controlling heat due to friction.

What is claimed is:

1. A clutch apparatus for an antenna which is rendered telescopic by a driving force from a motor, comprising:
   a main shaft;
   a driving rotary member which is fitted around said main shaft and is rotated by a driving force from a motor;
   an intermediate gear which is rotatably fitted around an axis which is provided on one surface of said driving rotary member and is different from said main shaft;
   a clutch gear which is fitted around said main shaft so as to be rotatable together with and relative to said driving rotary member, said clutch gear having a gear portion meshing with said intermediate gear, and a clutch disk member;
   at least one clutch plate which is provided at said main shaft to be rotatable together with said driving rotary member while being in contact with said clutch disk member of said clutch gear;
   contact means for bringing said clutch plate into contact with said clutch disk member of said clutch gear; and
   a driven rotary member which is fitted around said main shaft so as to supply the driving force transmitted from said driving rotary member to the antenna, said driven rotary member having a gear portion meshing with said intermediate gear on an inner surface thereof,
   wherein when a telescopic operation of the antenna is performed, said driving and driven rotary members are rotated together by the driving force from the motor and the antenna is thereby raised or lowered by a rotating force of said driven rotary member, and when the telescopic operation of the antenna is completed, said driven rotary member is stopped and thereafter said driving rotary member continues to be rotated for a predetermined interval.

2. An apparatus according to claim 1, which further comprises:
   releasing means for releasing the contact between said clutch plate and said clutch disk member of said clutch gear, when rotation of said driven rotary member is stopped.

3. An apparatus according to claim 1, wherein said contact means comprises a coil spring, a proximal end of which is supported by said driving rotary member, said coil spring urging a rear surface of said clutch plate.

4. An apparatus according to claim 1, wherein said clutch plate comprises at least one projection, said projection being engaged with said driving rotary member.

5. An apparatus according to claim 2, wherein said releasing means comprises at least one spacer engaged with said driving rotary member, and said projection is brought into slidable contact with said spacer and moves along said spacer when the telescopic operation of the antenna is completed.

6. An apparatus according to claim 1, wherein said clutch plate comprises at least one abutment on a surface thereof which is brought into contact with said driving rotary member, and said driven rotary member is provided with at least one other abutment inside a bottom surface thereof, such that when the telescopic operation of the antenna is performed, said abutment of said clutch plate is engaged with said other abutment of said driven rotary member.

7. An apparatus according to claim 1, wherein said main shaft comprises a push nut and a cap, and a distal end of said main shaft projected from a center of said driven rotary member is fixed by said push nut and said cap.

* * * * *